USOO5796576A

United States Patent [19]

Kim

[11] Patent Number: 5,796,576
[45] Date of Patent: Aug. 18, 1998

[54] NOTEBOOK COMPUTER HAVING A HINGE DEVICE ENABLING A DISPLAY UNIT TO BE SEPARABLE FROM A MAIN BODY

[75] Inventor: Tae-Yong Kim, Seoul, Rep. of Korea

[73] Assignee: SamSung Electronics Co., Ltd., Suwon, Rep. of Korea

[21] Appl. No.: 718,909

[22] Filed: Sep. 24, 1996

[30] Foreign Application Priority Data

Oct. 4, 1995 [KR] Rep. of Korea ............... 1995 33889

[51] Int. Cl.$^6$ ............... G06F 1/16; H05K 7/10
[52] U.S. Cl. ............... 361/681; 361/683; 16/259; 403/327
[58] Field of Search ............... 16/257, 259, 258; 403/78, 325, 327, 326; 439/13, 31, 76.1; 361/680, 681–683; 364/708.1; G06F 1/16

[56] References Cited

U.S. PATENT DOCUMENTS

| | | | |
|---|---|---|---|
| 4,495,672 | 1/1985 | Adams | 16/258 |
| 4,978,949 | 12/1990 | Herron et al. | |
| 5,041,965 | 8/1991 | Chen | |
| 5,138,565 | 8/1992 | Satou | |
| 5,168,423 | 12/1992 | Ohgami et al. | |
| 5,168,429 | 12/1992 | Hosoi | |
| 5,196,993 | 3/1993 | Herron et al. | |
| 5,233,502 | 8/1993 | Beatty et al. | |
| 5,262,759 | 11/1993 | Moriconi et al. | |
| 5,283,862 | 2/1994 | Lund | |
| 5,319,582 | 6/1994 | Ma | |
| 5,355,279 | 10/1994 | Lee et al. | 361/681 |
| 5,395,248 | 3/1995 | Kinoshita et al. | 439/31 |
| 5,498,165 | 3/1996 | Tseng | 439/31 |
| 5,507,072 | 4/1996 | Youn | |
| 5,566,048 | 10/1996 | Esterberg et al. | 361/681 |
| 5,600,580 | 2/1997 | Honjo et al. | 364/708.1 |

FOREIGN PATENT DOCUMENTS

| | | |
|---|---|---|
| 3936-261-A | 5/1990 | Germany |
| 4-205327A | 7/1992 | Japan |
| WO 93/01700 | 1/1993 | WIPO |

*Primary Examiner*—Lynn D. Feild
*Attorney, Agent, or Firm*—Robert E. Bushnell, Esq.

[57] ABSTRACT

The present invention provides an improved design for a notebook computer with a detachable display unit. A connector is pivotally mounted on the display unit fits into a socket in the main body to provide an electrical connection between the main body and the display unit while allowing the display unit to rotate open and closed onto the main body. A pair of hinge members mechanically connect the display unit to the main body. At least one of the hinge members is slidably mounted on the top side of the main body to allow the user to pull the hinge member to the side, thus increasing the gap between the hinge members, thus allowing the user to either attach or remove the display unit to or from the main body.

25 Claims, 3 Drawing Sheets

NOTEBOOK COMPUTER HAVING A HINGE DEVICE ENABLING A DISPLAY UNIT TO BE SEPARABLE FROM A MAIN BODY

CROSS-REFERENCE TO RELATED APPLICATIONS

This application makes reference to, incorporates the same herein, and claims all benefits accruing under 35 U.S.C. § 119 arising from an application for Notebook Computer Having A Hinge Device Enabling A Display Unit To Be Separable From A Main Body earlier filed in the Korean Industrial Property Office, on the 4th of Oct. 1995, and there duly assigned Ser. No. 33889/1995.

FIELD OF THE INVENTION

The present invention relates to a hinge device for a notebook computer, and more particularly, to a hinge device for easily combining and separating a display unit with and from a main body of a notebook computer.

BACKGROUND OF THE INVENTION

A notebook computer typically is made up of a display unit and a main body containing main elements for operating the computer. The display unit is pivotally connected to the main body by a hinge device so that the display unit can be folded over the main body when the user is finished using the device.

It is often desired, for maintenance or for upgrading, to have a notebook computer where the cover containing the display unit can easily be separated from and reattached to the main body. The prior art discloses many designs for notebook computers that allow the cover containing the display to be easily attached to and detached from the main body. For example, German patent No. 3936-261-A shows a portable notebook computer with a detachable lid containing a display. An electrical connector on the bottom side of the cover mates with a socket in the main body, providing an electrical connection between the cover and the main body. The connector/socket combination folds or pivots into a recess allowing the cover containing the display to rotate open and closed. Similarly, U.S. Pat. No. 5,138,565 for Shielded Electronic Apparatus Having a Removable Shielded Display to Satou discloses a notebook computer having a removable display containing cover. A notebook computer contains a connecter electrically connecting the display unit to the main body. In addition, it contains hinge shafts on either side for the connector. A cable extends along the hinge axes of the device. In addition, the disclosure contains the electromagnetic shielding in the main body. Also, U.S. Pat. No. 5,262,759 for a Removable Computer Display Interface to Moriconi et al. discloses a removable computer display interface. A connector is under the side of the display, and the display is hingedly attached to the main body. The display is able to rotate open and close with respect to the main body well maintaining electrical contact.

U.S. Pat. No. 5,196,993 for a Removable Stand Alone Display for Laptop Computer, U.S. Pat. No. 5,030,128 for a Docking Module, and U.S. Pat. No. 4,978,949 for a Locking Mechanism and Support Legs for Removable Display Assembly, all to Herron et al., discloses a laptop computer with removable display containing cover. A lever is used to detach the display unit from the main body. An electrical cable, extends from the main body to the display unit, and the display unit is operationally rotatable during use. The drawback with using levers is that they can be easily activated accidentally. Levers can pop-out or come loose, thus causing the display unit to be inadvertently separated from the computer.

U.S. Pat. No. 5,041,965 for a Laptop Computer With Detachable Display For Overhead Projector to Chen discloses a laptop computer with a detachable display. Fig.2 which shows male and female electrical connectors for electrical connection as well as cylindrical lug 622 from that each side for each hinge for mechanical connection between the cover and the main body. As a result, the notebook computer pivots via pair of hinge mechanisms located at the rear of the main body where connects to the bottom of the display unit. The display unit is free to rotate open and close while maintaining the electrical contact with the main body. The drawback with the above design is that the display will separate should the user inadvertently lift the notebook computer by the display.

What is needed is an improved design for a notebook computer that has the detachable display feature that is both reliable and easy to operate, and does not allow the display unit to easily become inadvertently separated from the computer.

SUMMARY OF THE INVENTION

It is therefore an object to provide a design for a notebook computer that allows the user to easily detach and reattach the display unit to the computer without encountering the risk of inadvertent detachment.

To realize the above object, the present invention provides a notebook computer comprising a main body and a display unit. According to a major feature of the invention, a hinge member extends from a lower end of the display unit, and a connector is pivotally fixed to the hinge member. The connector is designed to transmit an electrical signal to the display unit. A connector fixing portion is formed in the main body so that the connector can be tightly fitted thereinto while providing an electrical connection. Therefore, the display unit can be firmly fixed on the main body by fitting the connector into the connector-fixing portion and it can rotate since the connector is pivotally connected to the hinge member.

According to another feature of the present invention, a first and a second pivotal detents are formed on the main body, which pivotally attach opposite ends of the hinge member in order to ensure a stable connection between the cover and the main body.

Lastly, at least one of the first and second pivotal detents are slidably mounted on the top side of the main body, allowing for the separation and attachment of the display unit to and from the main body.

BRIEF DESCRIPTION OF DRAWINGS

The subject of the invention is described in greater detail by way of example with the aid of the accompanying drawings, wherein.

DETAILED DESCRIPTION OF THE INVENTION

Figure 1:
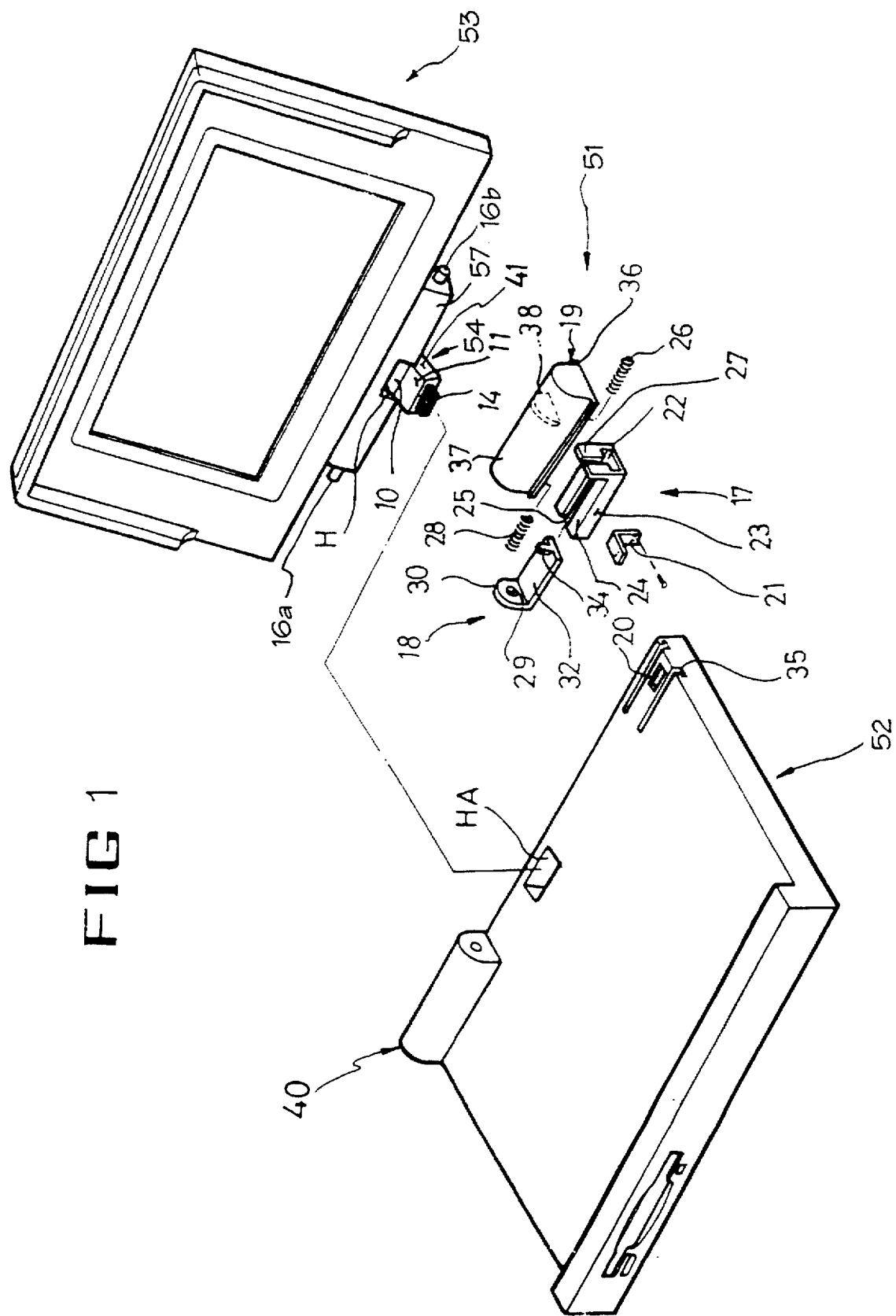
FIG. 1 is an exploded perspective view of a hinge device of a notebook computer in accordance with the present invention.
Figure 2:
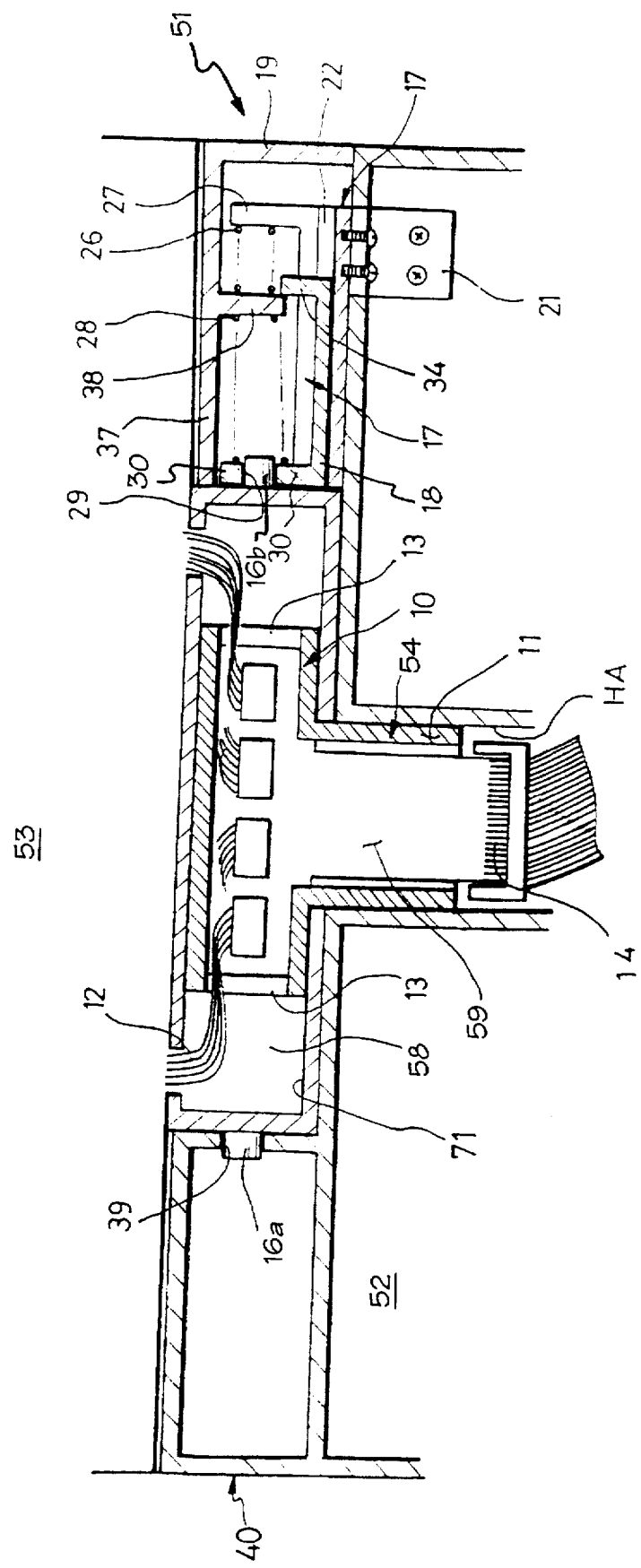
FIG. 2 is a cross-sectional view of the hinge axis of the detachable notebook computer when fully assembled.

Referring first to FIGS. 1 and 2, there are shown views of a hinge device according to a preferred embodiment of the invention. The hinge device includes longitudinal hollow projection 57 extending from and running along a lower end of display unit 53 and connector assembly 54 for transmitting an electronic signal to display unit 53 from main body 52. Projection 57 is provided with a setting hole H through which the connector assembly 54 is pivotally inserted. The connector assembly 54 includes a T-shaped outer tube 41 having a horizontal portion 10 and a vertical portion 11, and a printed circuit plate board 59 integrally inserted into the tube 41. The horizontal portion 10 is rotatable fitted through the setting hole H into hollow portion 71 of projection 57, being formed having a leading hole 13 on each side of horizontal portion 10 of connector assembly 54, such that cables 12 connected with the printed circuit plate board 59 can be led out of connector assembly 54 and into longitudinal hollow projection 57 of display unit 53. The vertical portion 11 extends out of the setting hole H. The printed circuit plate board 59 has an input connector terminal 14 extending out of the vertical portion 11 toward hole HA in main body 52.

Hole HA, is formed on a main body 52 such that the vertical portion 1 1 of connector assembly 54 can be tightly inserted thereinto while the input connector terminal 14 of printed circuit plate board 59 is electrically connected to an output connector terminal (not shown) of main body 52. Accordingly, since horizontal portion 10 of connector assembly 54 is pivotally inserted into hollow portion 71 of projection 57, and vertical portion 10 is tightly fitted into hole HA formed on main body 52, display unit 53 can be foldable onto main body 52 while it rotates about horizontal portion 10 of connector assembly 54. Therefore, the above-described structure enables display unit 53 to be separated from or combined with main body 52 easily and simply by assembling or disassembling connector assembly 54 to or from hole HA, reducing the chance of damaging the computer when maintenance or upgrading is performed, and reducing the amount of time needed to separate/combine the display unit from/to the main body.

According to another feature of the present invention, there is provided hinge attachment units 51 and 40 which are mounted on each side of the main body 52 so as to enhance the pivotable mounting ability of display unit 53 on main body 52 through the insertion of hinge lugs 16a and 16b formed on each side of projection 57 when connector assembly 54, pivotally inserted into hole H in projection 57 of the display unit 53, is inserted into the corresponding hole HA of the main body 52. In the preferred embodiment of the present invention, the hinge attachment unit 40 is fixedly mounted on one side of the main body 52, while the other hinge attachment unit 51 is slidably mounted on the other side of the main body 52. The slidable hinge attachment unit 51 comprises a sliding plate 18, elastically supported by a first spring member 28, in which hinge lug 16b is inserted, a receiving portion 17 on which the sliding plate 18 slides, and a cover portion 19, elastically supported by a second spring member 26, which pulls or pushes the sliding plate 18 such that the hinge lugs 16a and 16b can be separated from or combined with hinge attachment units 40 and 51 respectively.

The receiving portion 17 is fixedly installed on the main body 52 by a bracket 21 through a locking hole 20 formed in the main body 52. The receiving portion 17 is preferably hollow and boxshaped with opened sides, comprising inner bottom surface 22 on which sliding plate 18 slides, top portion 24 forming slit 25 such that vertical lug 34 of sliding plate 18 slides or is included projectingly, vertical supporting plate 27 formed extendedly on the other side, opposite to the side in which the sliding plate 18 is inserted, such that the second spring member 26 can elastically support the cover portion 19.

Sliding plate 18 comprises vertical plate 30 forming inserting hole 29 through which the hinge lug 16b is inserted, and horizontal plate 32 formed at a right angle to vertical plate 30, which slides on inner bottom surface 22 of the receiving portion 17. Vertical lug 34 is formed projectingly on one side of horizontal plate 32 of sliding plate 18 opposite vertical plate 30, to be engaged with vertical bar 38 of cover portion 19.

Cover portion 19 is installed to be elastically supported by second spring member 26, and pulls or pushes sliding plate 18 to separate or combine hinge lug 16 from or with sliding plate 18. Cover portion 19 is made up of flange portions 36 formed on both the front lower end and a rear lower end of cover portion 19 such that cover portion 19 can be inserted along sliding grooves 35 of main body 52. Cover portion 19 is also made up of an arch-type roof portion 37 which is formed integrally with both flanges 36, and the above mentioned vertical bar 38, extending from a certain portion in the inner surface of the roof portion 37 and engaging vertical lug 34 of sliding plate 18.

Figure 3:
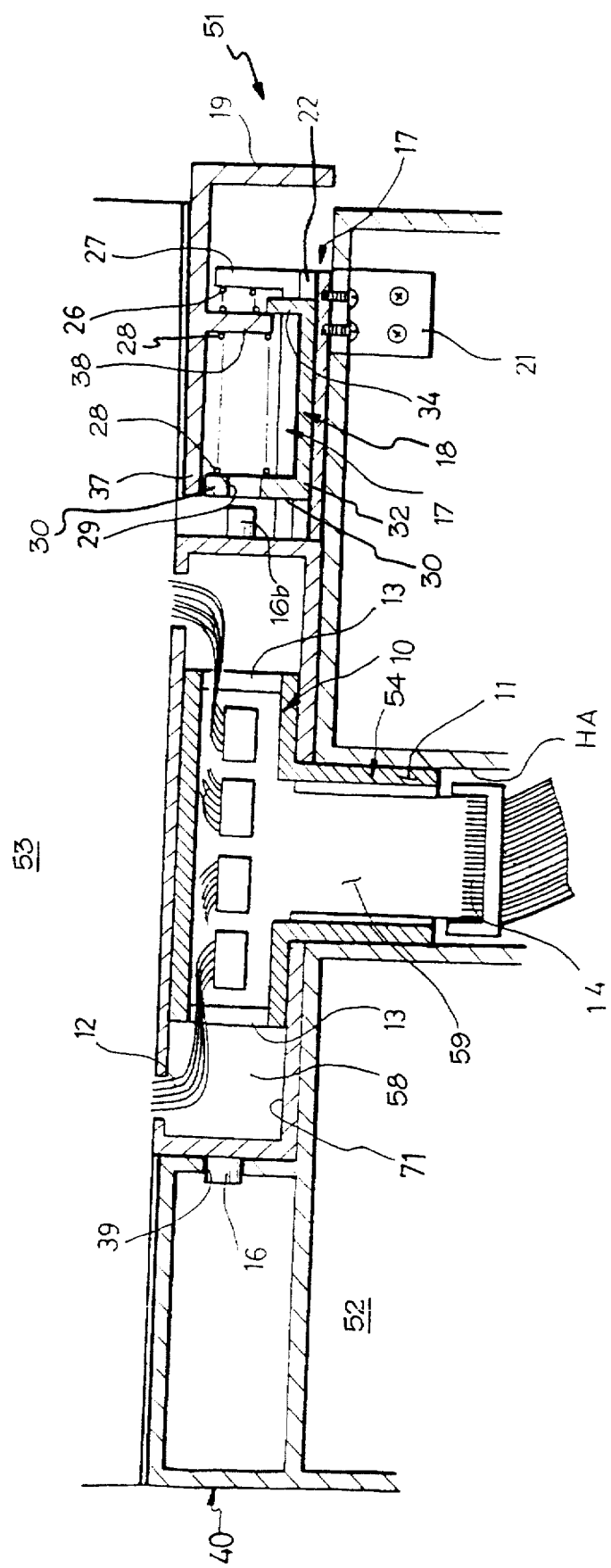
FIG. 3 is a cross-sectional view of the hinge axis of the detachable notebook computer during attachment or detachment of the cover to or from the main body.

The present invention structured as in the above is operated as follows, with reference to FIG. 3. First, a user inserts connector assembly 54 in chamber 58 hollow portion 71 of projection 57 of display unit 53. When the user pulls outwardly on cover portion 19 of the separable hinge attachment unit 51, the user can insert one hinge lug 16a into aperture 39 in fixed hinge attachment unit 40. Connector assembly 54 is then fitted into corresponding hole HA in main body 52. While cover portion 19 is being pulled, the sliding plate 18 is also pulled according to the engagement of vertical lug 34 with vertical bar 38 of cover portion 19. Therefore, the other hinge lug 16b of projection 57 enables the display unit 53 to be preliminarily mounted on the main body 52 without being blocked by the sliding plate 18. Then, if the cover portion 19 returns along the sliding grooves 35, the sliding plate 18 also returns by the biasing force of the first and the second spring members 28 and 26 respectively, causing inserting hole 29 of vertical plate 30 of sliding plate 18 of slidable hinge attachment unit 51 to be fitted about 16b. Thus, display unit 53 is now pivotally attached to main body 52. The procedure for separating the display unit 53 from the main body 52 is carried out in the reverse order as in the above-mentioned description.

In a second embodiment, both hinge attachment units may be slidably mounted to main body 52, allowing the user to pull on either one to attach or detach the display unit to or from main body 52. Thus, in this second embodiment, neither of the hinge attachment units are fixedly attached stationary with respect to main body 52.

The present invention enables a display unit to be separated/combined from/with a main body easily and simply, reducing the chance of damaging the computer when upgrading or performing maintenance, reducing the amount of time needed to separate/combine the display unit from/to the main body.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A notebook computer having a hinge system, comprising:

a main body;

a display unit;

a cylindrical hollow hinge member, extending from a lower end of said display unit, said cylindrical hollow hinge member having an axis, said cylindrical hollow hinge member having a first end and a second end opposite said first end, said first end and said second end perpendicular to said axis, said axis running between said first end and said second end, said cylindrical hollow hinge member having a cylindrical surface between said first end and said second end, said cylindrical surface surrounding said axis, said first end, said second end and said cylindrical surface perforated by respective apertures;

a connector assembly, pivotally fixed to said cylindrical hollow hinge member, transmitting an electrical signal from said main body to said display unit;

a plurality of connector wires entering said cylindrical hollow hinge member at said apertures in said first and second ends and exiting said aperture in said cylindrical surface, said connector wires running inside said cylindrical hollow hinge member and parallel to said axis of said cylindrical hollow hinge member for electrically connecting said display unit to said connector assembly; and a connector socket, formed in said main body in which said connector assembly is tightly inserted when providing electrical connection between said main body and said display unit; and enabling said display unit to be completely separated from said main body when said connector assembly is not inserted in said connector socket.

2. The notebook computer according to claim 1, further comprising a first and a second pivotal detents, formed on said main body, pivotally fixes opposite ends of said hinge member in order to ensure a stable hinged combination.

3. The notebook computer according to claim 2, wherein at least one of said first and second pivotal detents are slidably mounted on said main body.

4. The notebook computer according to claim 1, wherein the connector assembly comprises a T-shaped outer tube having a horizontal portion pivotally fixed to said hinge member and a vertical portion inserted in said connector socket, and a printed circuit plate board integrally inserted into the tube.

5. The notebook computer according to claim 4, wherein the horizontal portion is provided with leading holes on its opposite ends such that cables connected with the printed circuit plate board contained in said outer tube connector can be led outwardly therethrough.

6. The notebook computer according to claim 3, wherein said first pivotal detent comprises a sliding plate, elastically supported by a first spring member, in which one of a pair of hinge lugs of a cylindrical hollow hinge member is inserted, a receiving portion fixedly installed on said main body through a bracket on which said sliding plate slides, and a cover portion, elastically supported by a second spring member which pulls or pushes said sliding plate such that each of said pair of hinge lugs can be separated or combined from/with said first and second pivotal detents respectively.

7. The notebook computer according to claim 6, wherein said receiving portion is preferably hollow and box-shaped with opened sides, comprising an inner bottom surface on which said sliding plate slides, a top portion forming a slit such that a vertical lug of said sliding plate slides or is included projectingly, a vertical supporting plate formed extendedly on the other side, opposite to the side in which said sliding plate is inserted, such that said second spring member can elastically support said cover portion.

8. The notebook computer according to claim 6, wherein said sliding plate comprises a vertical plate forming an inserting hole through which one of said pair of cylindrical hollow hinge lugs of said hinge member is inserted, a horizontal plate folded from said vertical plate which slides on said inner bottom surface of said receiving portion, a vertical lug formed projectingly on one side of said horizontal plate to be engaged with a vertical bar of said cover portion.

9. The notebook computer according to claim 6, wherein said cover portion comprises two flange portions formed respectively on a front lower end and a rear lower end such that said cover portion can be inserted along sliding grooves of said main body, an arch-type roof portion which is formed integrally with both flange portions, and a vertical bar, engaging said vertical lug of said sliding plate and extending from a certain portion in said inner surface of said roof portion, which is elastically supported by said second spring member.

10. A notebook computer, comprising:

a main body having a front side, a back side, a top side, a bottom side, a left side, and a right side;

a cover having a top side, a bottom side, a front side, and a back side, said cover having a display unit on said front side, said cover having a cylindrical hollow hinge member extending along said bottom side, said cylindrical hollow hinge member having an axis, said cylindrical hollow hinge member having a first end and a second end opposite said first end, said first end and said second end perpendicular to said axis, said axis running between said first end and said second end, said cylindrical hollow hinge member having a cylindrical surface between said first end and said second end, said cylindrical surface surrounding said axis, said first end, said second end and said cylindrical surface perforated by respective apertures, a hinge lug extending from each end of said cylindrical hollow hinge member;

a connector assembly, pivotally attached to said hinge member;

a plurality of connector wires entering said cylindrical hollow hinge member at said apertures in said first and second ends and exiting said aperture in said cylindrical surface, said connector wires running inside said cylindrical hollow hinge member and parallel to said axis of said cylindrical hollow hinge member, said plurality of connector wires electrically connecting said display unit to said connector assembly;

a socket formed on said top side of said main body near said back side, between said left side and said right side, said socket can engage and disengage from said connector assembly, allowing electrical contact to be established between said main body and said display unit; and a pair of hinge attachment units located on said top side of said main body, each of said hinge attachment units positioned along said rear side of said main body, one of said pair of hinge attachment units located near said left side and the other of said pair of hinge attachment units located near said right side, at least one of said pair of hinge attachment units being slidably attached to said main body in a direction parallel to said rear side of said main body, said pair of hinge attachment units can pivotally engage and disengage said cylindrical hollow hinge member of said cover.

11. The notebook computer of claim 10, wherein each said slidably attached hinge attachment member comprises:

a receiving portion fixedly attached to said top side of said main body near said rear side, said receiving portion having a first end and a second end, said second end located near an outer edge defined as being either said left side or said right side;

a sliding plate slidably inserted into said first end of said receiving portion, said sliding plate movable in a direction parallel to said rear side of said main body, said sliding plate having a first and a second end, said second end positioned closest to said outer edge of said main body, said first end having a vertical plate perforated by an aperture that accommodates said hinge lug of said hinge member of said cover;

a protective cover slidably attached to said main body, said protective cover positioned over said receiving portion and over said sliding plate, said protective cover slidable in a direction parallel to said rear side of said main body; and a pair of elastic springs biasing said protective cover and said sliding plate away from said outer edge of said main body.

12. The notebook computer of claim 11, when said protective cover slidably attached to said main body is slid against said spring bias and towards said outer edge, said sliding plate is forced to slide towards said outer edge, allowing for the insertion or removal of said cover from said main body.

13. The notebook computer of claim 12, when said cover is connected to said main body by said hinge members and said pair of hinge attachment units, said bottom side of said cover can pivot about said back side of said main body allowing said display unit on said front side of said cover to either open up or fold onto said main body while maintaining electrical connection between said main body and said cover.

14. The notebook computer of claim 13, further comprising cables that run along an axis of said pair of hinge attachment units for electrically connecting said display unit to said main body.

15. A notebook computer, comprising:

a main body having a front side, a back side, a top side, a bottom side, a left side, and a right side;

a cover having a top side, a bottom side, a front side, and a back side, said cover having a display unit on said front side, said cover having a hinge member extending along said bottom side, a hinge lug extending from each end of said hinge member; and a pair of hinge attachment units located on said top side of said main body, each of said hinge attachment units positioned along said rear side of said main body, one of said pair of hinge attachment units located near said left side and the other of said pair of hinge attachment units located near said right side, at least one of said pair of hinge attachment units being slidably attached to said main body in a direction parallel to said rear side of said main body, said slidably attached hinge attachment unit comprising:

a receiving portion fixedly attached to said top side of said main body near said rear side, said receiving portion having a first end and a second end, said second end located near an outer edge defined as being either said left side or said right side, a sliding plate slidably inserted into said first end of said receiving portion, said sliding plate movable in a direction parallel to said rear side of said main body, said sliding plate having a first and a second end, said second end positioned closest to said outer edge of said main body, said first end having a vertical plate perforated by an aperture that accommodates said hinge lug of said hinge member of said cover, a protective cover slidably attached to said main body, said protective cover positioned over said receiving portion and over said sliding plate, said protective cover slidable in a direction parallel to said rear side of said main body, and a pair of elastic springs biasing said protective cover and said sliding plate away from said outer edge of said main body.

16. The notebook computer of claim 15, when said protective cover slidably attached to said main body is slid against said spring bias and towards said outer edge, said sliding plate is forced to slide towards said outer edge, allowing for the insertion or removal of said cover from said main body.

17. The notebook computer of claim 16, when said cover is connected to said main body by said hinge members and said pair of hinge attachment units, said bottom side of said cover can pivot about said back side of said main body allowing said display unit on said front side of said cover to either open up or fold onto said main body.

18. The notebook computer of claim 17, further comprising cables that run along an axis of said pair of hinge attachment units for electrically connecting said display unit to said main body.

19. The process of attaching a cover of a notebook computer onto a main body of a notebook computer, comprising:

sliding one of a pair of hinge attachments slidably mounted on said main body against a spring bias to a periphery of said main body;

placing a lower end of said cover of said notebook computer between said hinge attachments;

inserting a first hinge lug integrally formed on a first end of said lower end of said cover into an aperture formed in a first of said pair of hinge attachments;

inserting an electrical connector assembly pivotally attached to said lower end of said cover into an electrical connector socket formed in said main body;

inserting a second hinge lug integrally formed on a second end opposite to said first end on said lower end of said cover into an aperture formed in a second of said pair of hinge attachments; and releasing said one of said pair of hinge attachments, allowing said one of said pair of hinge attachments to move towards the other of said pair of hinge attachments, pivotally attaching said hinge lugs and said cover to said main body.

20. The process of detaching a cover of a notebook computer from a main body of a notebook computer, comprising:

sliding one of a pair of hinge attachments slidably mounted on said main body against a spring bias to a periphery of said main body;

removing a first hinge lug integrally formed on a first end of a lower end of said cover from an aperture formed in a first of said pair of hinge attachments;

disconnecting an electrical connector assembly pivotally attached to said lower end of said cover from an electrical connector socket formed in said main body;

removing a second hinge lug integrally formed on a second end opposite to said first end on said lower end of said cover from an aperture formed in a second of said pair of hinge attachments;

lifting and removing said lower end of said cover from said main body of said notebook computer; and releasing said one of said pair of hinge attachments, allowing said one of said pair of hinge attachments to move towards the other of said pair of hinge attachments.

21. A notebook computer having a hinge system, comprising:

a main body;

a display unit;

a hinge member, extending from a lower end of said display unit;

a connector assembly, pivotally fixed to said hinge member, transmitting an electrical signal from said main body to said display unit; and a connector socket, formed in said main body in which said connector assembly is tightly inserted when providing electrical connection between said main body and said display unit; and enabling said display unit to be completely separated from said main body when said connector assembly is not inserted in said connector socket, wherein the connector assembly comprises a T-shaped outer tube having a horizontal portion pivotally fixed to said hinge member and a vertical portion inserted in said connector socket, and a printed circuit plate board integrally inserted into the tube, wherein the horizontal portion is provided with leading holes on its opposite ends such that cables connected with the printed circuit plate board contained in said outer tube connector can be led outwardly therethrough.

22. A notebook computer having a hinge system, comprising:

a main body;

a display unit;

a hinge member, extending from a lower end of said display unit;

a connector assembly, pivotally fixed to said hinge member, transmitting an electrical signal from said main body to said display unit;

a connector socket, formed in said main body in which said connector assembly is tightly inserted when providing electrical connection between said main body and said display unit; and enabling said display unit to be completely separated from said main body when said connector assembly is not inserted in said connector socket; and a first and a second pivotal detents, formed on said main body, pivotally fixes opposite ends of said hinge member in order to ensure a stable hinged combination, wherein at least one of said first and second pivotal detents are slidably mounted on said main body, wherein said first pivotal detent comprises a sliding plate, elastically supported by a first spring member, in which one of a pair of hinge lugs of a hinge member is inserted, a receiving portion fixedly installed on said main body through a bracket on which said sliding plate slides, and a cover portion, elastically supported by a second spring member which pulls or pushes said sliding plate such that each of said pair of hinge lugs can be separated or combined from/with said first and second pivotal detents respectively.

23. The notebook computer according to claim 22, wherein said receiving portion is preferably hollow and box-shaped with opened sides, comprising an inner bottom surface on which said sliding plate slides, a top portion forming a slit such that a vertical lug of said sliding plate slides or is included projectingly, a vertical supporting plate formed extendedly on the other side, opposite to the side in which said sliding plate is inserted, such that said second spring member can elastically support said cover portion.

24. The notebook computer according to claim 22, wherein said sliding plate comprises a vertical plate forming an inserting hole through which one of said pair of hinge lugs of said hinge member is inserted, a horizontal plate folded from said vertical plate which slides on said inner bottom surface of said receiving portion, a vertical lug formed projectingly on one side of said horizontal plate to be engaged with a vertical bar of said cover portion.

25. The notebook computer according to claim 22, wherein said cover portion comprises two flange portions formed respectively on a front lower end and a rear lower end such that said cover portion can be inserted along sliding grooves of said main body, an arch-type roof portion which is formed integrally with both flange portions, and a vertical bar, engaging said vertical lug of said sliding plate and extending from a certain portion in said inner surface of said roof portion, which is elastically supported by said second spring member.

* * * * *